United States Patent [19]
Milano et al.

[11] 4,008,774
[45] Feb. 22, 1977

[54] HYDRAULICALLY POWERED DRILL PRESS

[76] Inventors: Martin B. Milano; David A. Rutherford, both c/o George Spector, 3615 Woolworth Building, 233 Broadway, New York, N.Y. 10007; George Spector, 3615 Woolworth Building, 233 Broadway, New York, N.Y. 10007

[22] Filed: Oct. 22, 1974

[21] Appl. No.: 516,971

[52] U.S. Cl. .............................. 173/153; 408/130
[51] Int. Cl.² .................. B23B 39/00; B23B 45/04
[58] Field of Search .......... 408/130, 140, 129, 124; 173/9, 153, 159

[56] References Cited
UNITED STATES PATENTS

| | | | |
|---|---|---|---|
| 223,529 | 1/1880 | Morse | 173/159 X |
| 2,382,526 | 8/1945 | White | 173/159 |
| 2,409,738 | 10/1946 | Conner | 408/140 X |
| 2,459,902 | 1/1949 | Tucker | 408/130 |
| 2,724,134 | 11/1955 | Perlotto | 408/130 |
| 2,750,816 | 6/1956 | Mott | 173/159 X |
| 2,865,236 | 12/1958 | Parke | 408/130 |

*Primary Examiner*—Frank T. Yost
*Assistant Examiner*—Z. R. Bilinsky

[57] ABSTRACT

A drill press that is hydraulically driven; the drill press including a turbine motor through which oil is pumped, and the motor having a rotor that is connected to the drill press spindle so to rotate the same.

2 Claims, 2 Drawing Figures

HYDRAULICALLY POWERED DRILL PRESS

This invention relates generally to drill presses. More specifically it relates to drill press drives.

A principal object of the present invention is to provide a drill press that is powered by hydraulic means so to have a smoother rotation of a drill in order to achieve a more precisely evenly drilled out hole in a work.

Another object is to provide a hydraulically operated drill press that may have a single or multiple spindles all of which are powered hydraulically.

Still another object is to provide a hydraulically operated drill press which in one form of the invention incorporates the hydrauloc oil to both rotate the spindle and also exert the drill pressure against the work so to eliminate this pressure application being done by manual effort.

Other objects are to provide a hydraulically operated drill press which is simple in design, inexpensive to manufacture, rugged in construction, easy to use, and efficient in operation.

These and other objects will be readily evident upon a study of the following specification and the accompanying drawing wherein.

Figure 1:
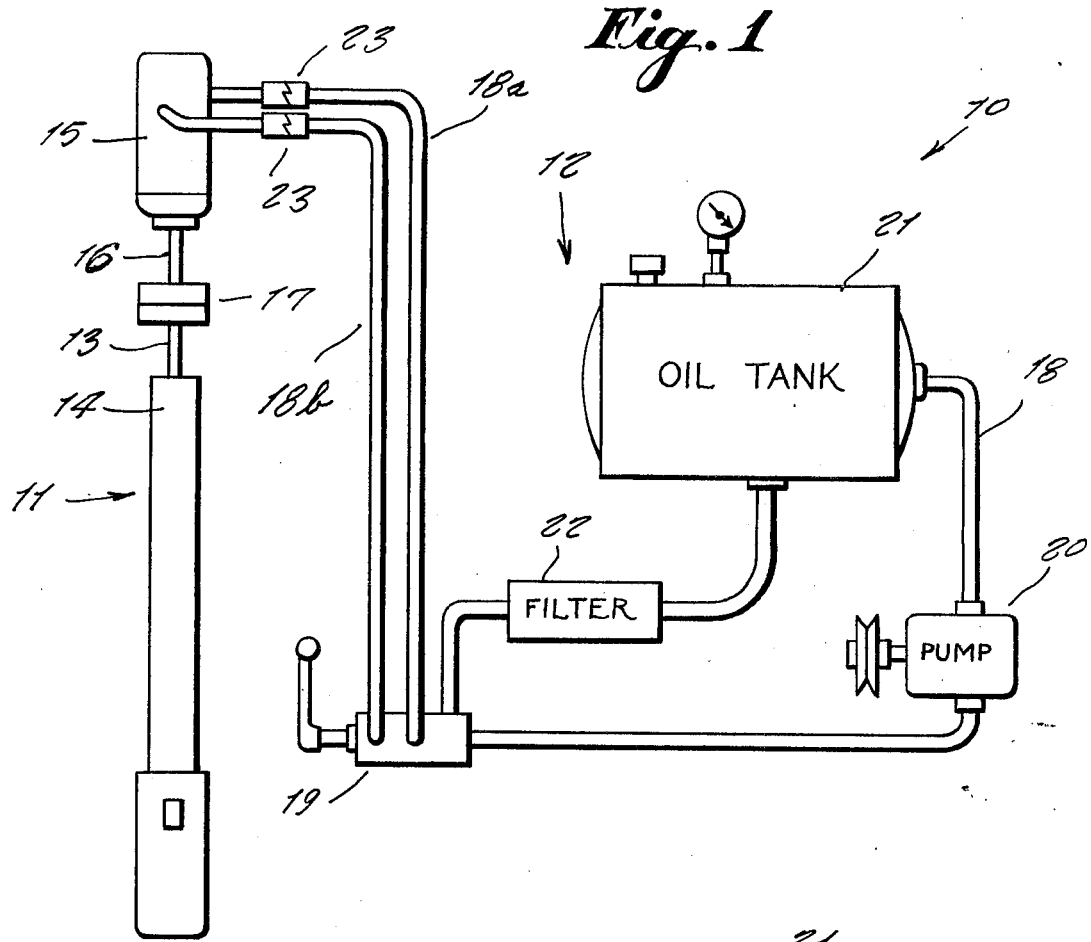
FIG. 1 is a diagrammatic view of the invention.

Referring now to the drawing in detail, and more particularly to FIG. 1 thereof at this time, the reference numeral 10 represents a hydraulically operated drill press assembly according to the present invention wherein there is a drill press 11 powered by a hydraulic system 12.

The drill press includes a spindle 13 supported rotatably within a drill press housing 14; the spindle at its one end having a drill chuck securely affixed thereto for drills to be attached therein, and the drill press also including conventional mechanisms for exerting drill pressure against the work. In the present invention, the drill press 11 also includes a turbine hydraulic motor 15 from which a rotor shaft 16 extends. The rotor shaft 16 and the spindle are connected together by means of a slip clutch 17 therebetween, so to permit the spindle to slip in case a drill is prevented to rotate by an excessive resistance that would otherwise stress or damage the work or the machine.

The system 12 includes an oil circuit of pipes 18 that connect the motor 15 to an on-off valve 19, motor-driven pump 20, oil tank 21 and oil filter 22. Pipe couplings 23 are provided on the pipes 18a and 18b connected to the intake and exhaust ports of the motor 15.

In use it is now evident that when valve 19 is turned on, and the pump 20 is operating, that oil movement through the motor 15 causes the drill press spindle to rotate. The valve may be of volume compensating type. In the case of a drill press having multiple spindles, all motors therefor are in parallel set up.

Figure 2:
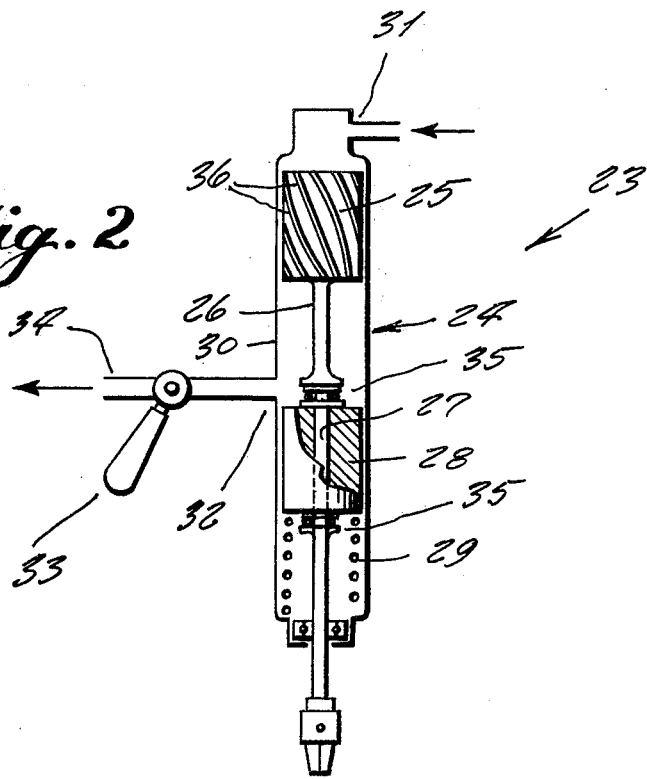
FIG. 2 is a detail view of a modified design of the invention in which the oil that drives the rotation of the chuck spindle also provides the downward pressure of a drill against a work, so that the operator exerts no effort during a drilling operation, but only operates a valve handle to control the speed and stopping of the machine.

In FIG. 2, a modified design of the invention illustrates drill press 23 having motor 24 in which turbine rotor 25 is affixed on rotor shaft 26. The shaft 26 extends freely rotatably through an opening 27 of a non-rotating piston 28 that is slidable against a compression coil return spring 29. The rotor, piston and spring are contained with a motor housing 30 having oil intake port 31 adjacent one end of the rotor and having an oil outlet prot 32 between the rotor and piston. A manually controlled valve 33 on an outlet line 34 from the port 32 controls the volume or amount of oil flow rate through the motor. A thrust bearing 35 around the shaft 26 is positioned against an end of the piston so that the shaft rotation does not exert a turning force thereagainst.

In use, it is evident that as the oil flows between the spiral fins 36 of the rotor 25, the shaft is caused to rotate. If the valve 33 is partly shut so that a greater amount of oil flows into the intake port than flows outward of the outlet port, then the piston is forced by the oil to slide against the return spring so to cause a drill in drill chuck 37 to bear down against the work. Opening the valve 33 causes the piston to be returned by the spring.

While various changes may be made in the detail construction, it is understood that such changes will be within the spirit and scope of the present invention as is defined by the appended claims.

We claim:

1. A hydraulically powered drill press comprising a hydraulically powered turbine motor having a rotor and depending shaft affixed thereto, having front and rear ends including means for delivering hydraulic fluid to power the rotor, in combination with a housing encompassing the shaft and rotor including a drill chuck mounted on the front end of said shaft, wherein said housing further includes piston means for forcing the chuck and work axially together, wherein the housing includes inlet and outlet ports spaced axially, said rotor being therebetween and wherein the said piston means is axially affixed to the shaft at a location between said outlet port, and said chuck wherein the shaft, rotor and piston means are slidably mounted in the housing for axial movement relative to the housing, including bearings to permit rotation of said shaft relative to said piston means, said piston means sealingly engaging the housing to provide differential pressure on said piston thereby facing the shaft axially forward towards the work.

2. A device as in claim 1 wherein the outlet port includes a valve to control flow therefrom and a compression spring is provided in said housing between said piston and said chuck to force said piston rearward against the hydraulic force acting thereon.

* * * * *